(12) United States Patent
Takemura

(10) Patent No.: US 11,509,560 B2
(45) Date of Patent: Nov. 22, 2022

(54) INFORMATION PROCESSING APPARATUS, COMMUNICATION SYSTEM, AND INFORMATION PROCESSING METHOD

(71) Applicant: Kazumasa Takemura, Kanagawa (JP)

(72) Inventor: Kazumasa Takemura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

(21) Appl. No.: 16/999,428

(22) Filed: Aug. 21, 2020

(65) Prior Publication Data

US 2021/0083957 A1   Mar. 18, 2021

(30) Foreign Application Priority Data

Sep. 13, 2019 (JP) .............................. JP2019-167612
May 27, 2020 (JP) .............................. JP2020-092342

(51) Int. Cl.
*H04L 43/0876* (2022.01)
*G06F 21/46* (2013.01)

(52) U.S. Cl.
CPC .......... *H04L 43/0876* (2013.01); *G06F 21/46* (2013.01); *G06F 2221/2137* (2013.01)

(58) Field of Classification Search
None
See application file for complete search history.

(56) References Cited

U.S. PATENT DOCUMENTS

| | | | | |
|---|---|---|---|---|
| 5,872,916 A * | 2/1999 | Fukuoka | ............. | G06F 9/44505 726/21 |
| 8,019,082 B1 * | 9/2011 | Wiedmann | .......... | H04W 12/065 370/254 |
| 10,419,908 B1 * | 9/2019 | Hutz | .................... | H04L 61/6022 |
| 2002/0095420 A1 * | 7/2002 | Hovsepian | .......... | G07F 17/0014 |
| 2008/0083037 A1 * | 4/2008 | Kruse | ..................... | G06F 21/88 726/27 |
| 2011/0235549 A1 * | 9/2011 | Ahlers | .................... | H04L 41/12 370/255 |
| 2016/0295546 A1 * | 10/2016 | Yumura | ................ | H04W 4/029 |

(Continued)

FOREIGN PATENT DOCUMENTS

| | | | |
|---|---|---|---|
| JP | 2004-040156 | 2/2004 | |
| JP | 2016-158094 | 9/2016 | |
| WO | WO-2019037350 A1 * | 2/2019 | ......... H04L 63/0838 |

*Primary Examiner* — Chris Parry
*Assistant Examiner* — Abderrahmen Chouat
(74) *Attorney, Agent, or Firm* — IPUSA, PLLC

(57) ABSTRACT

An information processing apparatus includes circuitry; and a memory storing computer-executable instructions that cause the circuitry to generate a password for connecting to a communication relay apparatus based on an operation to use the communication relay apparatus; transmit, to the communication relay apparatus, an addition request signal representing a request to add an identifier for identifying the communication relay apparatus, the addition request signal including the identifier and the generated password for connecting to a network that is set in association with the identifier on a per-identifier basis; and transmit, to the communication relay apparatus, a deletion request signal, which includes the identifier, representing a request to delete the identifier upon determining that an elapsed time from when the communication relay apparatus has added the identifier has exceeded a possible usage time of using the network.

13 Claims, 14 Drawing Sheets

(56) References Cited

U.S. PATENT DOCUMENTS

| | | | | |
|---|---|---|---|---|
| 2017/0054711 A1* | 2/2017 | Shen | .................. | G06Q 30/0204 |
| 2018/0242154 A1* | 8/2018 | Ballard | ................... | H04W 4/50 |
| 2019/0356668 A1* | 11/2019 | Alcorn | .................. | H04L 9/3215 |
| 2020/0014552 A1* | 1/2020 | Tan | ..................... | H04L 12/2809 |
| 2020/0106920 A1* | 4/2020 | Ruan | .................... | H04N 1/4413 |

\* cited by examiner

FIG.8

GUEST NETWORK MANAGEMENT TABLE ~T2

| SSID | PASSWORD | PASSWORD CHARACTER TYPE | USAGE STATUS | POSSIBLE USAGE TIME (MINUTES) | USAGE START TIME | USAGE END TIME |
|---|---|---|---|---|---|---|
| Wi-Fi_Room_1 | 12345678 | NUMERICAL CHARACTER | IN USE | 30 | 2020/1/1 9:30 | 2020/1/1 10:00 |
| Wi-Fi_Room_2 | – | NUMERICAL CHARACTER | NOT USED | 60 | – | – |
| Wi-Fi_Room_3 | – | ALPHANUMERIC CHARACTER | NOT USED | 120 | – | – |

INFORMATION PROCESSING APPARATUS, COMMUNICATION SYSTEM, AND INFORMATION PROCESSING METHOD

CROSS-REFERENCE TO RELATED APPLICATION

The present application is based on and claims priority under 35 U.S.C. § 119 to Japanese Patent Application No. 2019-167612, filed on Sep. 13, 2019, and Japanese Patent Application No. 2020-092342, filed on May 27, 2020, the contents of which are incorporated herein by reference in their entirety.

BACKGROUND OF THE INVENTION

1. Field of the Invention

The present invention relates to an information processing apparatus, a communication system, and an information processing method.

2. Description of the Related Art

Conventionally, in facilities such as schools and offices, in order to temporarily allow guests who visit from outside to use devices and servers in the facilities, technologies have been developed to provide a network that is only available to users who are guests. For example, a technology is known in which a wireless local area network (LAN) access point transmits a beacon in which a Service Set Identifier (SSID) including a particular character string is set, so that users of the network are limited only to guests who know the particular character string.
Patent Document 1: Japanese Unexamined Patent Application Publication No. 2016-158094

SUMMARY OF THE INVENTION

According to one aspect of the present invention, there is provided an information processing apparatus including circuitry; and a memory storing computer-executable instructions that cause the circuitry to generate a password for connecting to a communication relay apparatus based on an operation to use the communication relay apparatus; transmit, to the communication relay apparatus, an addition request signal representing a request to add an identifier for identifying the communication relay apparatus, the addition request signal including the identifier and the generated password for connecting to a network that is set in association with the identifier on a per-identifier basis; and transmit, to the communication relay apparatus, a deletion request signal, which includes the identifier, representing a request to delete the identifier upon determining that an elapsed time from when the communication relay apparatus has added the identifier has exceeded a possible usage time of using the network.

BRIEF DESCRIPTION OF THE DRAWINGS

FIG. 8 is a diagram illustrating an example of a guest network management table according to the first embodiment of the present invention.

DETAILED DESCRIPTION OF THE PREFERRED EMBODIMENTS

The conventional technology requires a function of transmitting a beacon, in which an SSID including a particular character string is set, to a communication relay apparatus such as a wireless LAN access point. Therefore, in the case of a general-purpose communication relay apparatus that is not equipped to accommodate such a function, there has been a problem that it is not possible to provide a network to be temporarily used.

A problem to be addressed by an embodiment of the present invention is to provide a network to be temporarily used.

First Embodiment

Figure 1:
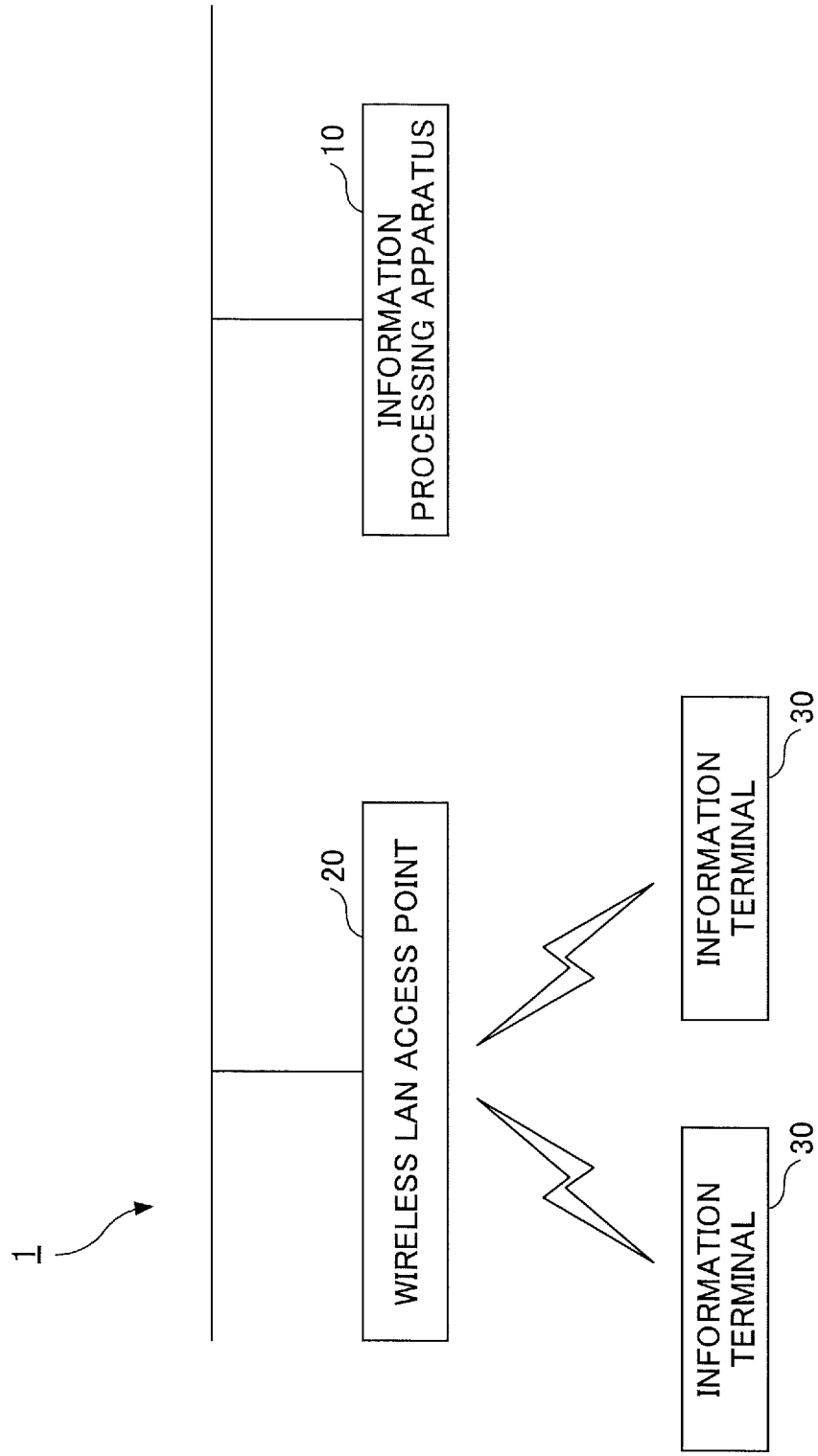
FIG. 1 is a diagram illustrating an example of a system configuration of a communication system according to a first embodiment of the present invention.

Hereinafter, embodiments of the present invention will be described with reference to the drawings. A communication system 1 according to the present embodiment includes an information processing apparatus 10, a wireless LAN access point 20, and an information terminal 30, as illustrated in FIG. 1.

The communication system 1 is a system that allows a visitor who visits a facility from outside (hereinafter referred to as a "guest") to temporarily use a wireless LAN. The information processing apparatus 10 makes various settings for the wireless LAN to be used by a guest, according to operations of a network administrator and the like who manages the network in the facility. Further, the information processing apparatus 10 sets the start and the end of using the wireless LAN for a guest (hereinafter, referred to as a "guest network"), according to operations by the guest and the like. The network administrator and the guest are examples of users who use the information processing apparatus 10.

The information processing apparatus 10 and the wireless LAN access point 20 are communicatively connected via a network such as a wired or wireless LAN, an intranet, or the Internet.

The information processing apparatus 10 controls the wireless LAN access point 20 by executing an exclusive-use application program (hereinafter, referred to as a guest network creation application) and transmitting a control signal to the wireless LAN access point 20.

The wireless LAN access point 20 is a communication relay apparatus that sets the wireless LAN and mediates communication between the information terminal 30 and the information processing apparatus 10, or another information terminal 30, or other devices connected to the wireless LAN access point 20. The wireless LAN access point 20 can set one or more Service Set Identifiers (SSIDs) as identifiers for identifying the wireless LAN access point 20 itself, and sets a guest network for each SSID. The wireless LAN access point 20 has an interface such as an Application Programming Interface (API) for executing the addition and deletion of an SSID upon receiving a request from the information processing apparatus 10. Deletion is a process of ending the usage of an SSID, including physically erasing the SSID from the setting information, disabling the setting, etc. In contrast, addition is a process of starting the usage of an SSID and includes physically adding the SSID to the setting information, enabling a disabled setting, etc.

The information terminal 30 is a terminal, which is capable of information communication such as a smartphone, a mobile phone, a personal digital assistant (PDA), and the like, and which is owned by the guest. The information terminal 30 connects to the wireless LAN set by the wireless LAN access point 20 and communicates with various devices connected to the wireless LAN.

Next, the hardware configuration of each apparatus included in the communication system 1 according to the present embodiment will be described.

Figure 2:
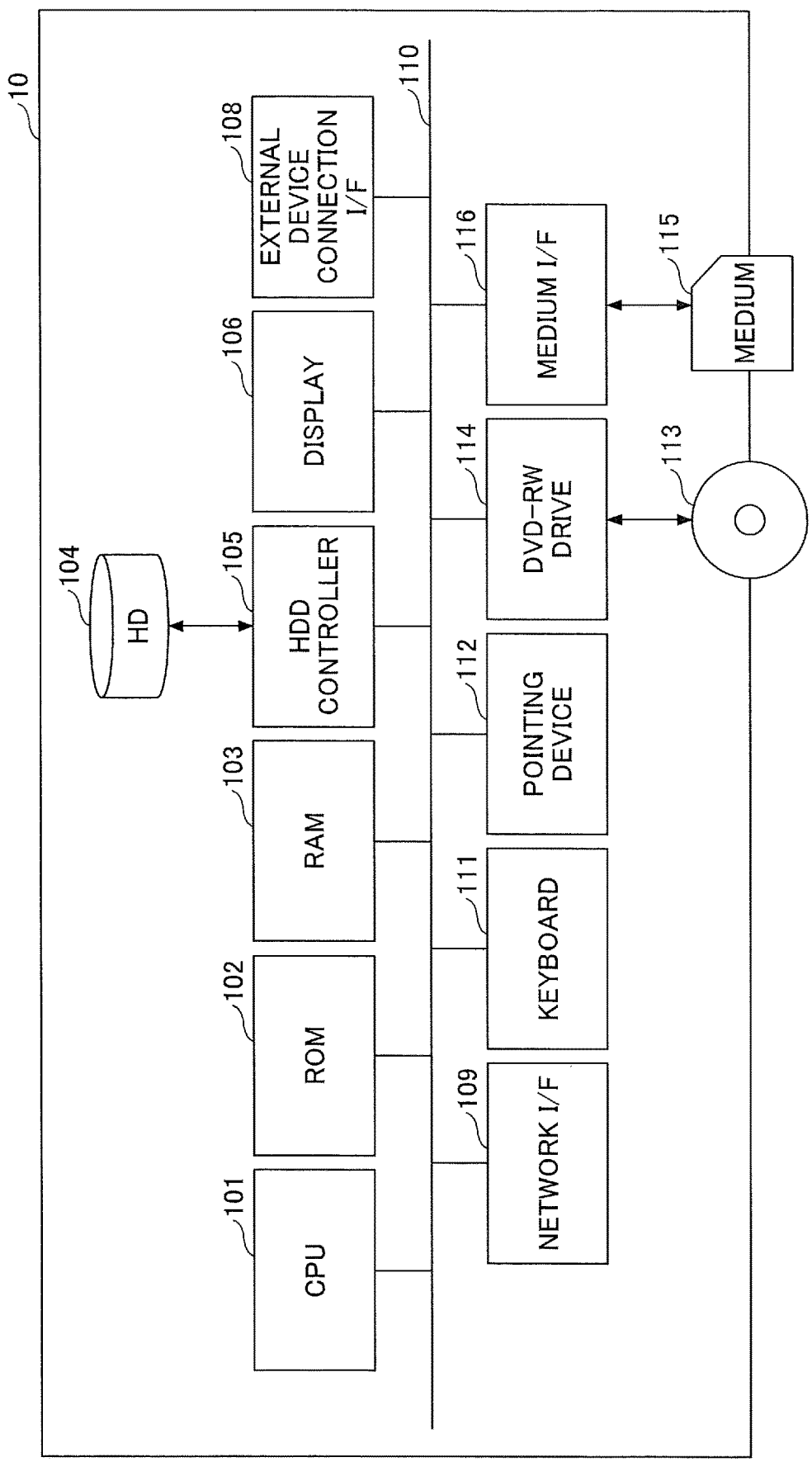
FIG. 2 is a diagram illustrating an example of a hardware configuration of an information processing apparatus according to the first embodiment of the present invention.

As illustrated in FIG. 2, the information processing apparatus 10 is constructed as a computer and includes a central processing unit (CPU) 101, a read-only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a Digital Versatile Disk Rewritable (DVD-RW) drive 114, and a medium I/F 116.

Among these, the CPU 101 controls the operation of the entire information processing apparatus 10. The ROM 102 stores a program used to drive the CPU 101, such as an initial program loader (IPL). The RAM 102 is used as the work area of the CPU 101. The HD 104 stores programs such as a guest network creation application, and various kinds of other data. The HDD controller 105 controls the reading or writing of various kinds of data to the HD 104 according to the control of the CPU 101. The display 106 displays various kinds of information such as cursors, menus, windows, characters, or images.

The external device connection I/F 108 is an interface for connecting various external devices. In this case, the external device may be, for example, devices such as a Universal Serial Bus (USB) memory or a printer. The network I/F 109 is an interface for performing data communication with the wireless LAN access point 20 and the like using a network. The bus line 110 is an address bus, a data bus, and the like for electrically connecting components such as the CPU 101 illustrated in FIG. 2.

The keyboard 111 is a type of input means with a plurality of keys for input of characters, numbers, various instructions, and the like. The pointing device 112 is a type of input means for selecting and executing various instructions, selecting a processing target, moving a cursor, and the like. The DVD-RW drive 114 controls the reading or writing of various kinds of data to the DVD-RW 113 as an example of a removable recording medium. the recording medium is not limited to a DVD-RW, but may be a Digital Versatile Disc Recordable (DVD-R), etc. The medium I/F 116 controls the reading or writing (storage) of data to a medium 115, such as a flash memory.

Figure 3:
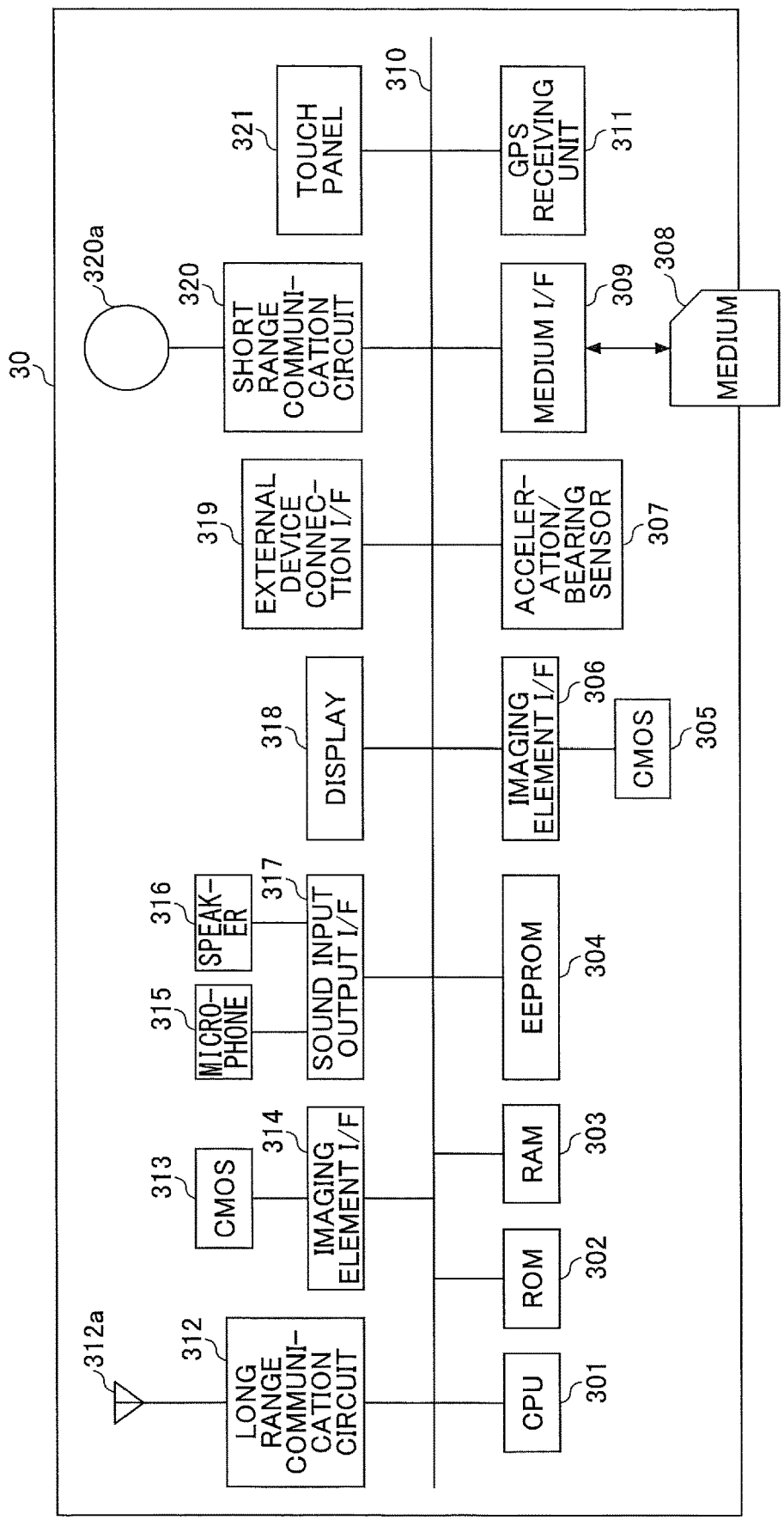
FIG. 3 is a diagram illustrating an example of a hardware configuration of an information terminal according to the first embodiment of the present invention.

As illustrated in FIG. 3, the information terminal 30 includes a central processing unit (CPU) 301, a read-only memory (ROM) 302, a random access memory (RAM) 303, an EEPROM 304, a complementary metal-oxide semiconductor (CMOS) sensor 305, an imaging element interface (I/F) 306, an acceleration/bearing sensor 307, a medium I/F 309, and a global positioning system (GPS) receiving unit 311.

Among these, the CPU 301 controls the operation of the entire information terminal 30. The ROM 302 stores the CPU 301 and programs used to drive the CPU 301, such as the initial program loader (IPL). The RAM 303 is used as the work area of the CPU 301. The EEPROM 304 reads out or writes various kinds of data, such as a smartphone program, according to the control of the CPU 301. The CMOS sensor 305 is a type of built-in imaging means that captures a subject (mainly a self-image) according to the control of the CPU 301 to obtain image data. The CMOS sensor 305 may be an imaging means, such as a Charge Coupled Device (CCD) sensor, instead of a CMOS sensor. The imaging element I/F 306 is a circuit that controls the driving of the CMOS sensor 305. The acceleration/bearing sensor 307 is a variety of sensors, such as an electromagnetic compass and a gyrocompass which detect geomagnetic fields, and an acceleration sensor. The medium I/F 309 controls the reading or writing (storage) of data to a recording medium 308, such as a flash memory. The GPS receiving unit 311 receives the GPS signal from the GPS satellite.

Further, the information terminal 30 includes a long range communication circuit 312, a CMOS sensor 313, an imaging element I/F 314, a microphone 315, a speaker 316, a sound input output I/F 317, a display 318, an external device connection I/F 319, a short range communication circuit 320, an antenna 320a of the short range communication circuit 320, and a touch panel 321.

Among these, the long range communication circuit 312 is a circuit for communicating with a device such as the wireless LAN access point 20 via a wireless LAN. The CMOS sensor 313 is a type of built-in imaging means that captures a subject according to the control of the CPU 301 and obtains image data. The imaging element I/F 314 is a circuit that controls the driving of the CMOS sensor 313. The microphone 315 is a built-in circuit that converts sound to an electrical signal. The speaker 316 is a built-in circuit that converts electrical signals to physical vibrations to produce sound, such as music and speech. The sound input output I/F 317 is a circuit that processes the input and output of sound signals between the microphone 315 and the speaker 316 according to the control of the CPU 301. The display 318 is a type of display means such as a liquid crystal display or an organic Electro Luminescence (EL) display for displaying an image of a subject or various icons. The external device connection I/F 319 is an interface for connecting various external devices. The short range communication circuit 320 is a communication circuit such as a Near Field Communication (NFC) or Bluetooth (registered). The touch panel 321 is a type of input means for operating the information terminal 30 when a user presses the display 318.

The information terminal 30 also includes a bus line 310. The bus line 310 is an address bus, data bus, or the like for electrically connecting elements such as the CPU 301 illustrated in FIG. 3.

Figure 4:
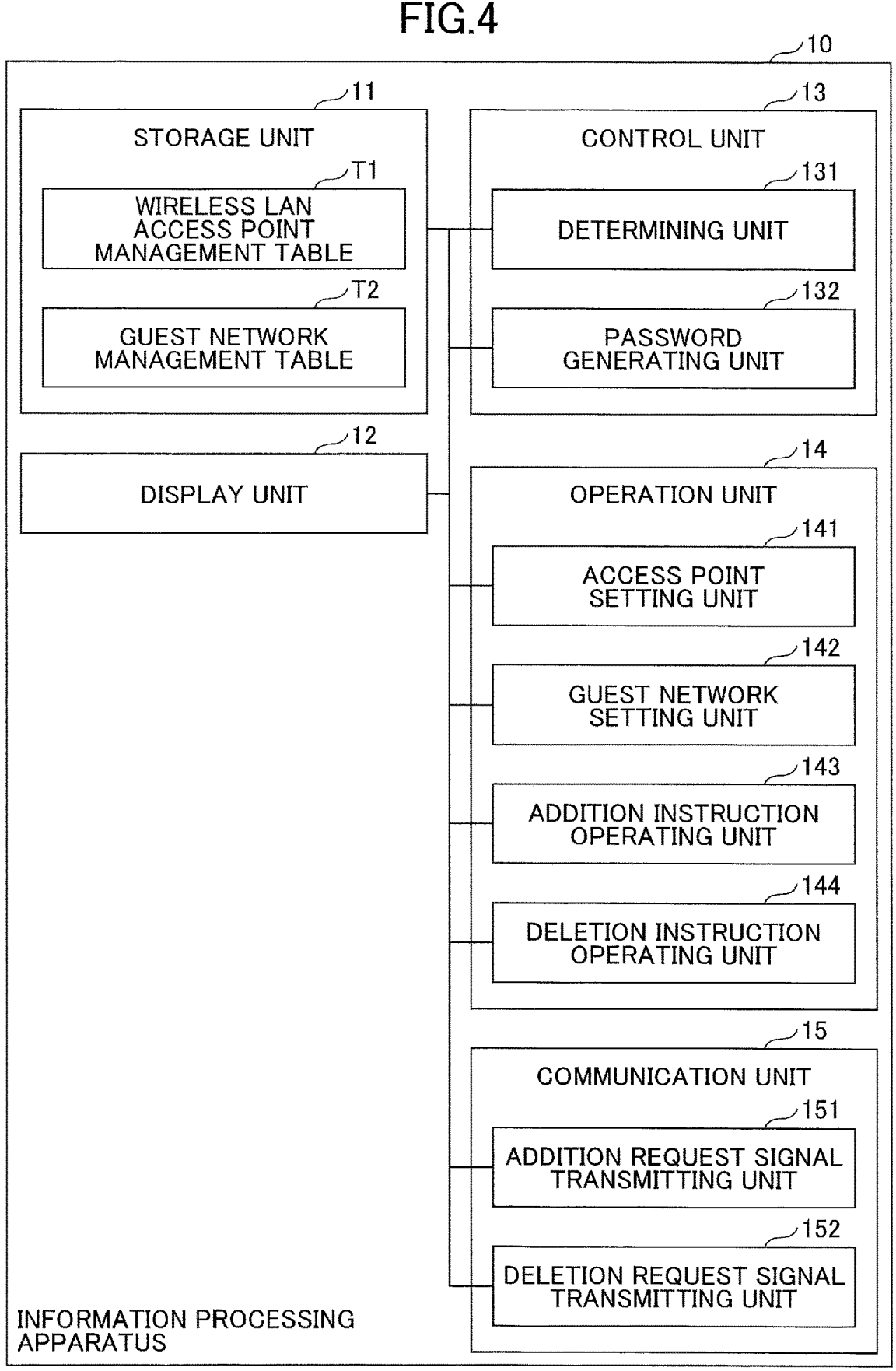
FIG. 4 is a diagram illustrating functions of the information processing apparatus according to the first embodiment of the present invention.

Next, functions provided by the information processing apparatus 10 will be described with reference to FIG. 4.

The information processing apparatus 10 according to the present embodiment includes a storage unit 11, a display unit 12, a control unit 13, an operation unit 14, and a communication unit 15.

The storage unit 11 stores a program of a guest network creation application and various kinds of data including setting data for executing the guest network creation application. The setting data for executing the guest network creation application includes a wireless LAN access point management table T1 and a guest network management table T2. The ROM 102, the RAM 103, and the HD 104 function as the storage unit 11, respectively.

The display unit 12 displays various kinds of data generated by executing the guest network creation application. The aforementioned display 106 functions as the display unit 12.

The control unit 13 executes various processes described below by executing the guest network creation application. The control unit 13 includes a determining unit 131 and a password generating unit 132.

The determining unit 131 continuously determines whether the elapsed time exceeds the possible usage time. Specifically, the determining unit 131 determines whether the elapsed time from when the wireless LAN access point 20 has added an SSID, has exceeded a possible usage time that is set in advance as the time of using the wireless LAN. As described below, the data representing the possible usage time is set by an operation of the user and is stored in the storage unit 11.

The password generating unit 132 generates a password for connecting to the wireless LAN access point 20 based on an operation for using the wireless LAN access point 20. Specifically, the password generating unit 132 generates a random character string as a password for connecting to a network set for each SSID.

The CPU 101 functions as the control unit 13 by reading out and executing the guest network creation application stored in the ROM 102 and the like.

The operation unit 14 implements various functions executed by the information processing apparatus 10 in response to operations by a guest or a network administrator. The operation unit 14 includes an access point setting unit 141, a guest network setting unit 142, an addition instruction operating unit 143, and a deletion instruction operating unit 144.

The access point setting unit 141 receives operations for various settings of the wireless LAN access point 20.

The guest network setting unit 142 receives operations for setting various kinds of guest networks.

The addition instruction operating unit 143 receives an operation of an addition instruction representing an instruction to add an SSID, from the guest.

The deletion instruction operating unit 144 receives an operation of a deletion instruction representing an instruction to delete an SSID, from the guest or the network administrator.

The keyboard 111 and the pointing device 112 cooperate with each other to function as the operation unit 14.

The communication unit 15 transmits, to the wireless LAN access point 20, various signals for controlling the wireless LAN access point 20 and receives response signals. The communication unit 15 includes an addition request signal transmitting unit 151 and a deletion request signal transmitting unit 152.

The addition request signal transmitting unit 151 transmits, to the wireless LAN access point 20, an addition request signal representing a request (addition request) for adding an SSID.

The deletion request signal transmitting unit 152 transmits, to the wireless LAN access point 20, a deletion request signal representing a request (deletion request) for deleting the SSID.

The aforementioned network I/F 109 functions as the communication unit 15.

Figure 5:
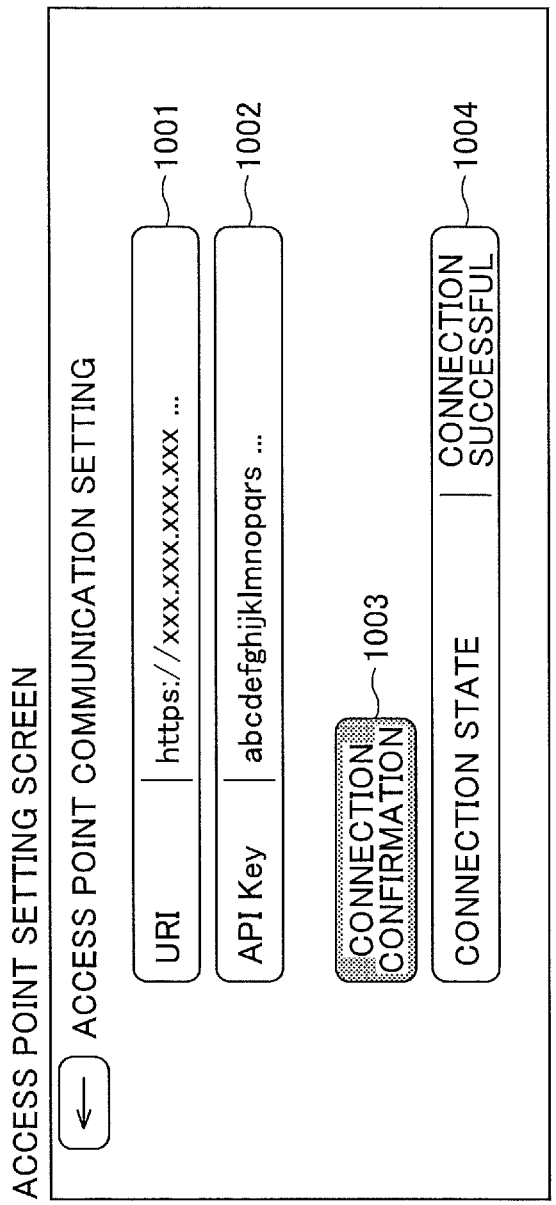
FIG. 5 is a diagram illustrating an example of an access point setting screen according to the first embodiment of the present invention.

Next, the operation of the communication system 1 will be described with reference to the drawings. First, an operation for making communication settings of the wireless LAN access point by the information processing apparatus 10 according to an operation by a network administrator and the like will be described. When the access point setting unit 141 of the operation unit 14 receives a request to display an access point setting screen by an operation by the network administrator and the like, the display unit 12 displays the access point setting screen as illustrated in FIG. 5.

The access point setting unit 141 receives, for example, input of an Uniform Resource Identifier (URI) representing the location of the wireless LAN access point 20, in a URI input field 1001, by an operation of a network administrator and the like who has referred to the network setting of the wireless LAN access point 20. The access point setting unit 141 receives input of an API key in an API key input field 1002. The API key is a character string determined in advance in the wireless LAN access point 20 as a password for calling the API of the wireless LAN access point 20. When the access point setting unit 141 receives an operation of pressing a connection confirmation button 1003, the communication unit 15 transmits a signal for confirming the connection to the wireless LAN access point 20 and waits for a response signal. When the communication unit 15 receives the response signal, the control unit 13 determines whether the connection is successful based on the response signal. The display unit 12 displays the determination result of the control unit 13 in a connection state field 1004.

Figure 6:
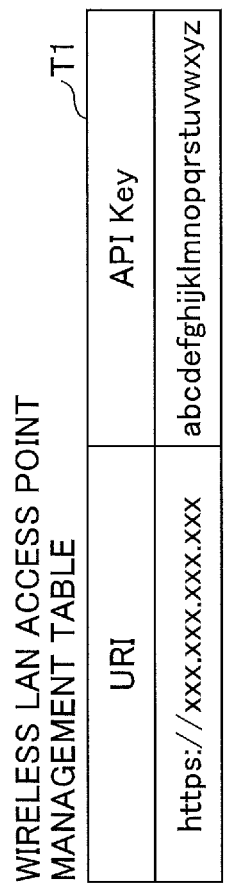
FIG. 6 is a diagram illustrating an example of a wireless LAN access point management table according to the first embodiment of the present invention.

In this manner, the information processing apparatus 10 makes the communication setting of the wireless LAN access point 20 according to the operations to the access point setting unit 141 by the network administrator. The input information is stored in the storage unit 11 as the wireless LAN access point management table T1. As illustrated in FIG. 6, the wireless LAN access point management table T1 includes the URI and the API key.

In order to simplify the system, the communication system 1 may be configured such that authentication is not necessary for calling the API of the wireless LAN access point 20. The authentication method for calling the API of the wireless LAN access point 20 may be a method other than using an API key, such as a combination of multiple authentications.

Figure 7:
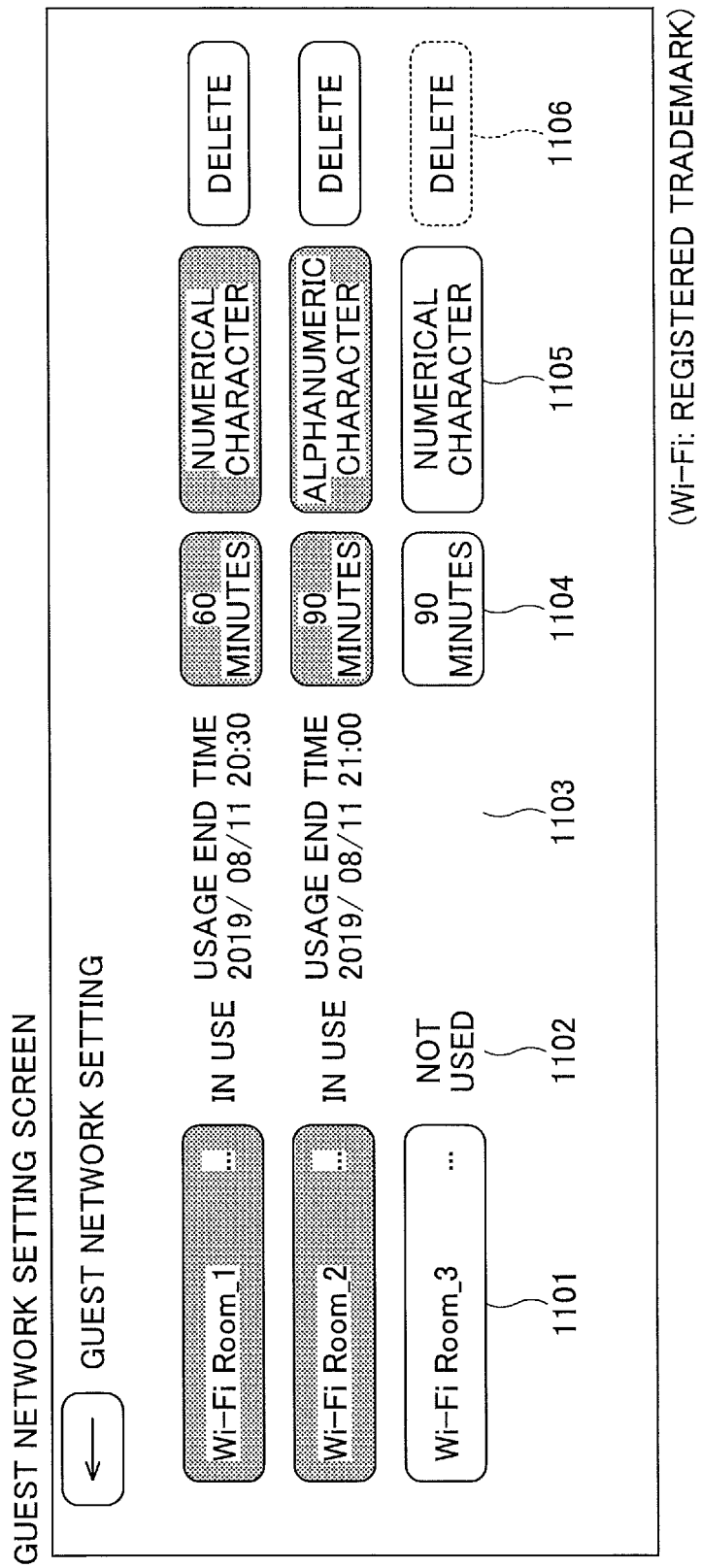
FIG. 7 is a diagram illustrating an example of a guest network setting screen according to the first embodiment of the present invention.

Next, an operation of setting the guest network by the information processing apparatus 10 upon receiving an operation by the network administrator and the like will be described. When the network administrator and the like operates the guest network setting unit 142 of the operation unit 14 and requests to display a guest network setting screen, the control unit 13 acquires the usage state of each guest network from the guest network management table T2, which will be described later. The control unit 13 causes the display unit 12 to display the guest network setting screen reflecting the acquired usage state. The guest network setting screen includes a list of guest networks for which settings are to be made, as illustrated in FIG. 7. The list of guest networks includes an SSID input field 1101, a usage state display field 1102, a usage end time display field 1103, a possible usage time input field 1104, a password character type selection field 1105, and a deletion button 1106, for each guest network.

In the SSID input field 1101, a character string representing the SSID for identifying the wireless LAN access point 20, set for each guest network, can be input. The usage state display field 1102 displays the usage state of the guest network. The usage end time display field 1103 displays the usage end time when the guest network is in use. The possible usage time input field 1104 can be used to input the possible usage time of using the guest network. In the password character type selection field 1105, it is possible to select the character type used for generating a password in the process described below. For example, "numerical character", "alphabetic character", or "alphanumeric character" may be included as options of the character type.

According to an operation by the network administrator and the like, input of the possible usage time of the guest network is received the in the possible usage time input field 1104, and, therefore, the guest network setting unit 142 is an example of a possible usage time setter.

The deletion button 1106 is a button for ending the usage of the presently used guest network. Specifically, upon receiving an operation of pressing the deletion button 1106, the communication unit 15 transmits a deletion request signal representing a request to delete the SSID of the guest network in use to the wireless LAN access point 20.

When the guest network is in use, it is not possible to input data or selections to the SSID input field 1101, the possible usage time input field 1104, or the password character type selection field 1105. When the guest network is not in use, the deletion button 1106 cannot be operated.

In this manner, the information processing apparatus 10 sets the guest network upon receiving operations by the network administrator. The input information is stored in the storage unit 11 as the guest network management table T2. As illustrated in FIG. 8, the guest network management table T2 includes the SSID, the password, the password character type, the usage state, the possible usage time, the usage start time, and the usage end time.

The SSID is a character string input to the SSID input field 1101. A password is generated in the SSID addition process described below. The password character type is the character type selected in the password character type selection field 1105. The usage state is the usage state of the guest network. Specifically, the usage state is "not used" in the initial state, and becomes "in use" when the SSID addition process described later is successful. Then, when the SSID deletion process described later or the process after the deletion button 1106 is pressed is successful, the usage state becomes "not used".

The possible usage time is the time input to the possible usage time entry field 1104, and is a time set in advance as the time length during which the guest network can be used. In the possible usage time input field 1104, for example, a time length in units of minutes is input. The usage start time is the time when the SSID has been added and the guest network has become available for usage. The usage end time is the time when usage is scheduled to end, calculated based on the possible usage time. The usage start time and the usage end time are set in the SSID addition process described below.

In the setting of the guest network described above, the guest network setting unit 142 is an example of a character string setter that sets a character string representing an SSID.

Figure 9:
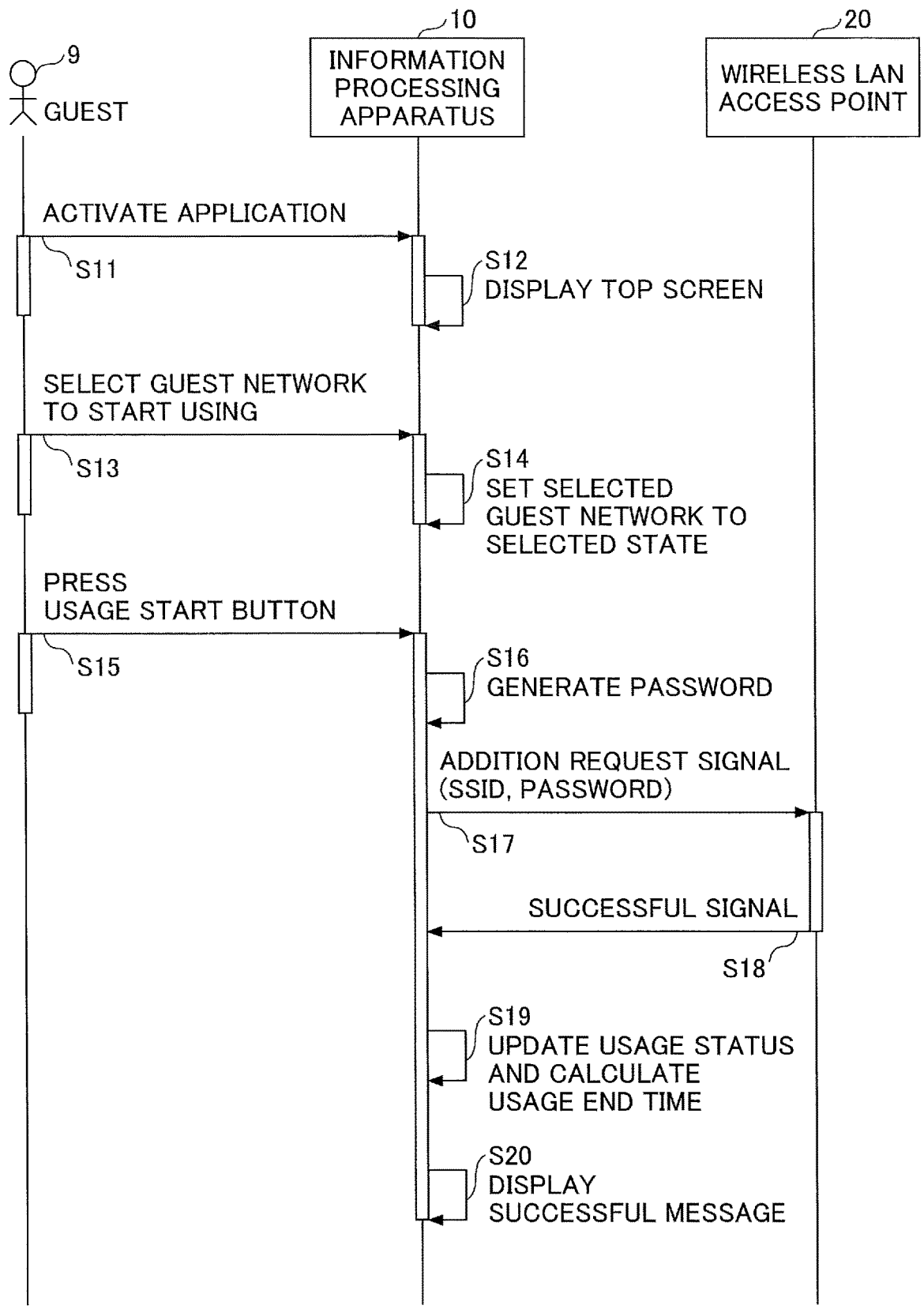
FIG. 9 is a diagram illustrating an example of a sequence of an SSID addition process according to the first embodiment of the present invention.
Figure 10:
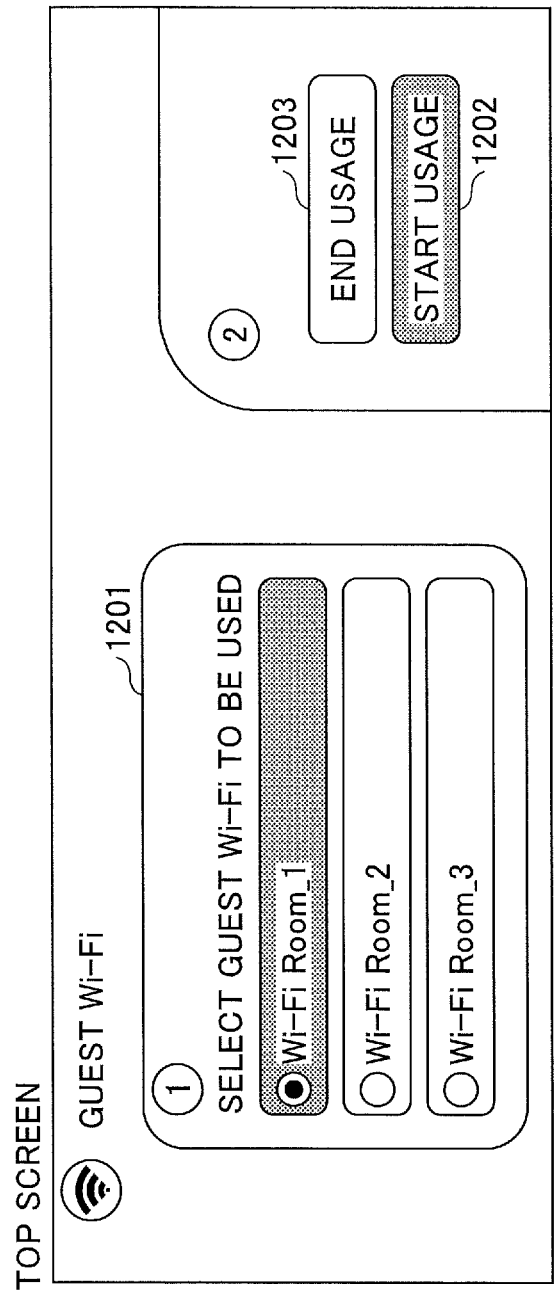
FIG. 10 is a diagram illustrating an example of a top screen according to the first embodiment of the present invention.

Next, the flow in which the information processing apparatus 10 causes the wireless LAN access point 20 to execute a process of adding the SSID when the guest starts using the guest network, will be described. As illustrated in FIG. 9, when the addition instruction operating unit 143 of the operation unit 14 receives an operation of requesting the activation of the guest network creation application by a guest 9 (step S11), the display unit 12 of the information processing apparatus 10 displays a top screen (step S12). Specifically, the control unit 13 acquires guest networks that are set, by referring to the guest network management table T2 stored in the storage unit 11. The control unit 13 causes the display unit 12 to display a top screen including a list of the acquired guest networks. As illustrated in FIG. 10, the top screen includes a guest network selection field 1201, a usage start button 1202, and a usage end button 1203. A list of set guest networks is displayed in the guest network selection field 1201.

Returning to FIG. 9, next, when the addition instruction operating unit 143 receives an operation of selecting a guest network that the guest wants to start using (step S13), the control unit 13 causes the selected guest network to be in a selected state (step S14). Specifically, the control unit 13 causes the display unit 12 to display a screen in which the background color of a portion displaying the SSID representing the selected guest network, is changed from white to yellow.

Subsequently, when the addition instruction operating unit 143 receives an operation of pressing the usage start button 1202 (step S15), the password generating unit 132 generates a password (step S16). Specifically, the password generating unit 132 generates, as a password, a character string randomly selected from among the characters corresponding to the password character type set in the guest network management table T2. The password generating unit 132 updates the guest network management table T2 by reflecting the generated password in the guest network management table T2 stored in the storage unit 11.

Next, in step S17, the addition request signal transmitting unit 151 of the information processing apparatus 10 transmits the addition request signal to the wireless LAN access point 20. Specifically, the addition request signal includes the SSID selected in step S13 and the password generated in step S16. The addition request signal may include other information, e.g., information indicating an authentication method such as a "Wi-Fi Protected Access Pre-Shared Key (WPA-PSK)".

The wireless LAN access point 20 includes an adding unit for adding an SSID. When the adding unit receives the addition request signal, the adding unit executes a process of adding the SSID based on the information included in the addition request signal. Thus, the wireless LAN access point 20 switches to a state of allowing the usage of the wireless LAN in response to a connection request including a combination of the added SSID and a password from the information terminal 30 and the like. Next, the wireless LAN access point 20 transmits a successful signal when the process of adding the SSID is successful (step S18).

In step S19, when the communication unit 15 of the information processing apparatus 10 receives the successful signal, the control unit 13 updates the usage state and calculates the usage end time. Specifically, the control unit 13 updates the usage state in the guest network management table T2 stored in the storage unit 11 to "in use". The control unit 13 calculates the usage end time by adding the possible usage time that has been set to the usage start time, by using the time when the success signal is received as the usage start time. The control unit 13 updates the guest network management table T2 stored in the storage unit 11 by reflecting the usage start time and the calculated usage end time.

When the process of adding the SSID fails in step S18, the wireless LAN access point 20 transmits a failure signal. When the communication unit 15 of the information processing apparatus 10 receives the failure signal, the addition request signal transmitting unit 151 again transmits an addition request signal to the wireless LAN access point 20.

Following the process in step S19, in step S20, the display unit 12 of the information processing apparatus 10 displays a successful message. Specifically, the display unit 12 displays the SSID, the password, and the like as information for connecting the information terminal 30 to the guest network together with a message indicating that the addition of the SSID has been successful. The display unit 12 may display an possible usage time, a usage start time, a usage end time, and the like.

As described above, in response to receiving the operation by the guest 9, the information processing apparatus 10 causes the wireless LAN access point 20 to execute a process of adding the SSID.

Next, a flow will be described in which the information processing apparatus 10 causes the wireless LAN access point 20 to execute a process of deleting the SSID when usage of the guest network is ended.

Figure 11:
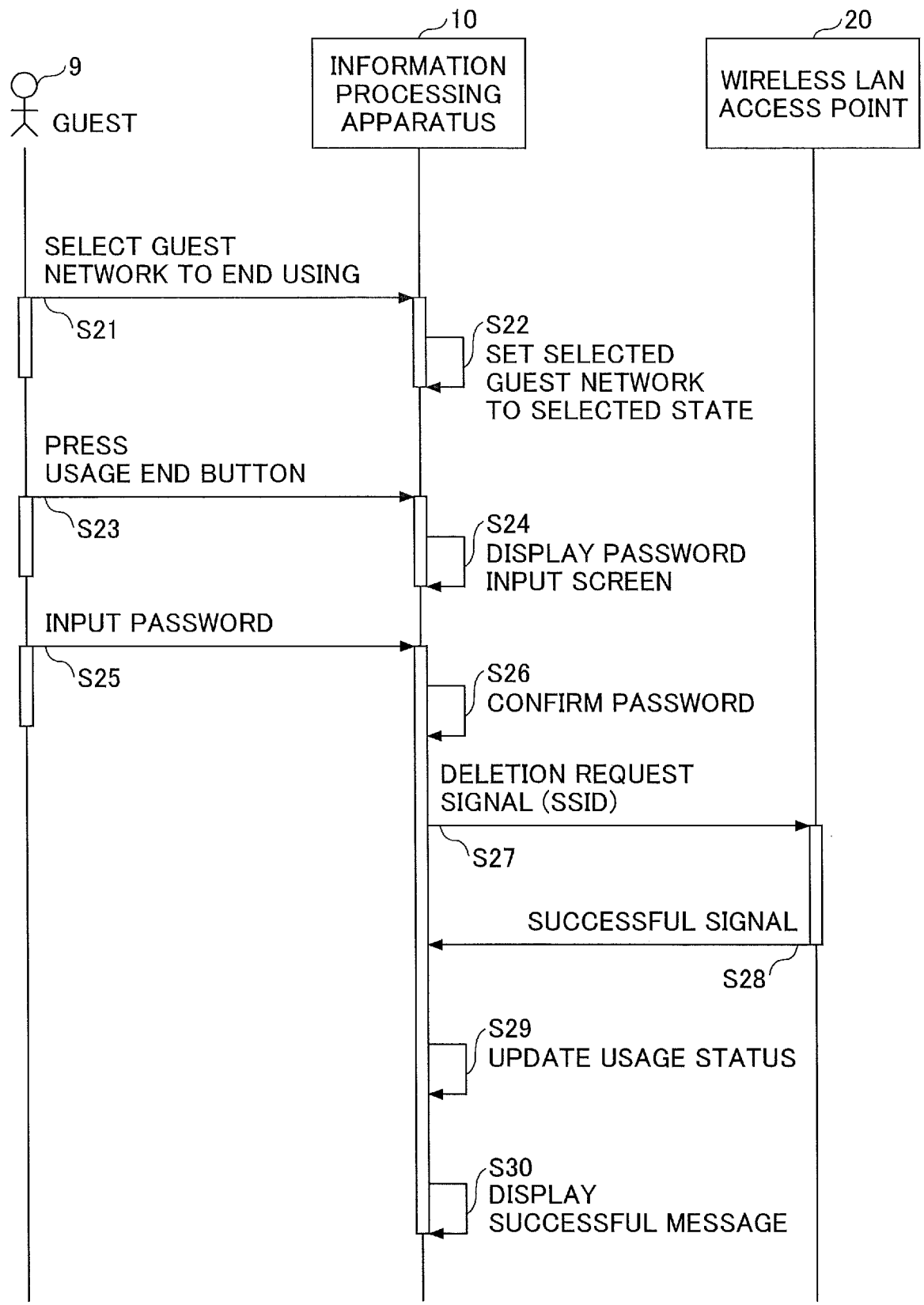
FIG. 11 is a diagram illustrating an example of a sequence of an SSID deletion process according to the first embodiment of the present invention.

As illustrated in FIG. 11, in step S21, the deletion instruction operating unit 144 receives an operation by the guest 9 in the state where the aforementioned top screen is displayed, and receives the operation of selecting the guest network that the guest 9 wants to stop using. In step S22, the control unit 13 causes the selected guest network to be in a selected state. Specifically, the control unit 13 causes the display unit 12 to display a screen in which the background color of the portion displaying the SSID representing the selected guest network is changed from white to yellow.

Subsequently, when the deletion instruction operating unit 144 receives an operation of pressing the usage end button 1203 (step S23), the display unit 12 displays a password input screen for the guest 9 to input the password (step S24). In step S25, the deletion instruction operating unit 144 receives an operation of inputting a password. The operations of step S23 and step S25 are examples of the operations of the SSID deletion instruction.

In step S26, the control unit 13 confirms the password. Specifically, the control unit 13 compares the character string input as the password by the guest 9 with the password stored in the guest network management table T2. If the passwords match, the control unit 13 proceeds to the next process. If the passwords do not match, the control unit 13 displays a message indicating that the password is incorrect and causes the display unit 12 to display the password input screen again.

Subsequently, in step S27, the deletion request signal transmitting unit 152 of the communication unit 15 transmits a deletion request signal to the wireless LAN access point 20. Specifically, the deletion request signal includes the SSID selected in step S21. The wireless LAN access point 20 includes a deleting unit for deleting an SSID. Upon receiving the deletion request signal, the deleting unit executes a process of deleting the SSID included in the deletion request signal. Accordingly, the wireless LAN access point 20 switches to a state of not allowing usage of the wireless LAN corresponding to the deleted SSID. Next, the wireless LAN access point 20 transmits a successful signal when the process of deleting the SSID is successful (step S28).

In step S29, when the communication unit 15 of the information processing apparatus 10 receives the successful signal, the control unit 13 updates the usage state. Specifically, the control unit 13 updates the usage state in the guest network management table T2 stored in the storage unit 11 to "not used".

In the process of step S28, when the process of deleting the SSID fails, the wireless LAN access point 20 transmits a failure signal. When the communication unit 15 of the information processing apparatus 10 receives the failure signal, the deletion request signal transmitting unit 152 again transmits the deletion request signal to the wireless LAN access point 20.

Following the process in step S29, in step S30, the display unit 12 of the information processing apparatus 10 displays a successful message. Specifically, the display unit 12 displays a message indicating that the SSID has been deleted successfully.

As described above, the information processing apparatus 10 causes the wireless LAN access point 20 to execute the process of deleting the SSID upon receiving the operation on the deletion instruction operating unit 144 by the guest 9.

Next, an operation in which the information processing apparatus 10 monitors the elapsed time from the start of usage of the guest network and automatically deletes the SSID, will be described.

Figure 12:
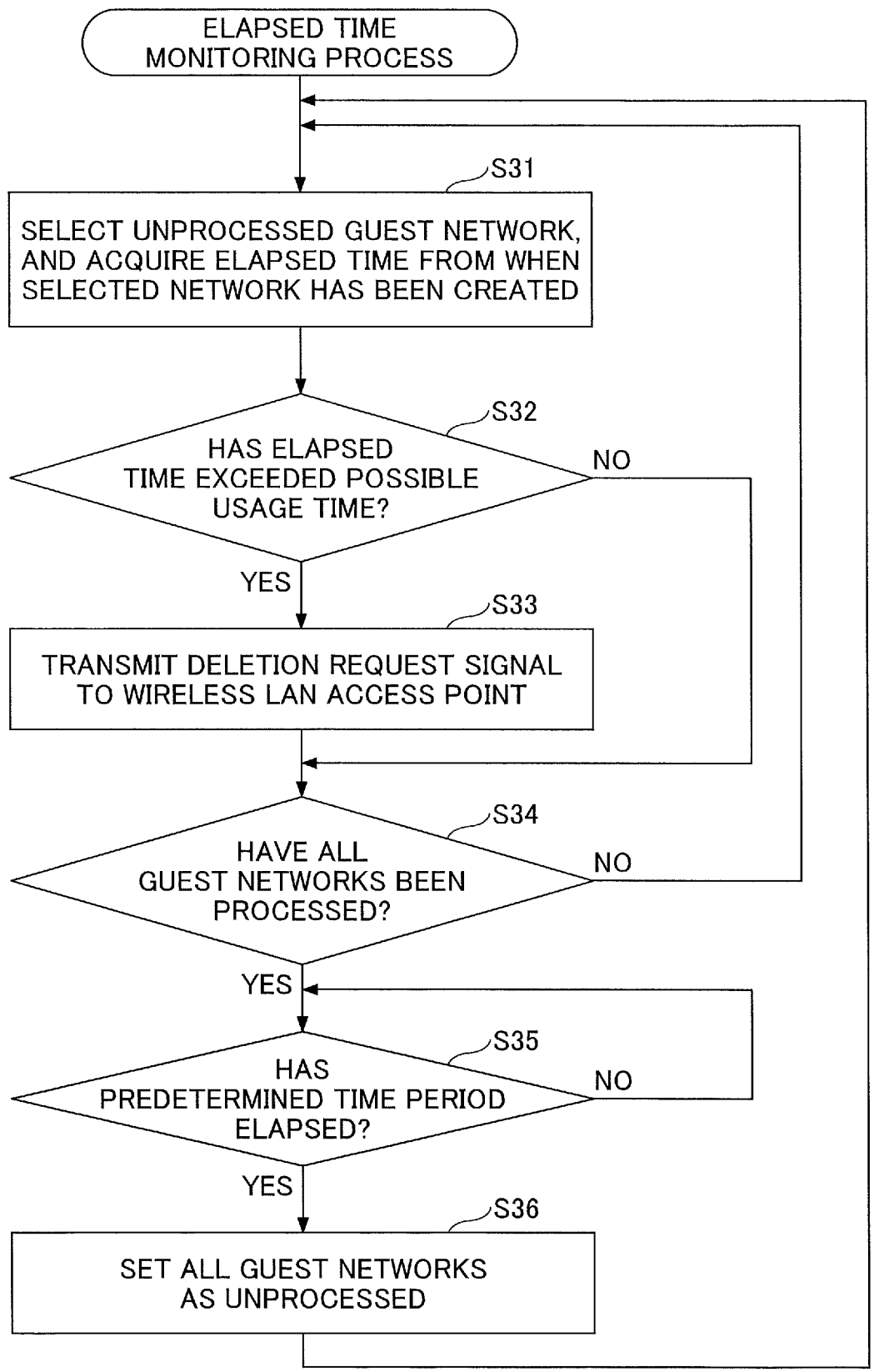
FIG. 12 is a flowchart of an elapsed time monitoring process according to the first embodiment of the present invention.

The information processing apparatus 10 starts the elapsed time monitoring process illustrated in FIG. 12 according to the activation of the information processing apparatus 10 or according to an operation by the network administrator.

When the information processing apparatus 10 starts the elapsed time monitoring process, the determining unit 131 of the control unit 13 selects an unprocessed guest network and acquires the elapsed time after the selected guest network has been created (step S31). Specifically, the determining unit 131 selects one unprocessed guest network in the elapsed time monitoring process and acquires the usage start time stored in the guest network management table T2. The determining unit 131 calculates the difference between the acquired usage start time and the present time and acquires the calculated difference as the elapsed time.

Next, in step S32, the determining unit 131 determines whether the elapsed time exceeds the possible usage time. When the determining unit 131 determines that the elapsed time exceeds the possible usage time (Yes in step S32), in step S33, the deletion request signal transmitting unit 152 transmits a deletion request signal to the wireless LAN access point 20 and the process proceeds to step S34. On the other hand, when the determining unit 131 determines that the elapsed time does not exceed the possible usage time (No in step S32), the determining unit 131 skips the process of step S33 and the process proceeds to step S34.

Next, in step S34, the determining unit 131 determines whether all of the guest networks have been processed. When the determining unit 131 determines that not all guest networks have been processed (No in step S34), the determining unit 131 returns to the process of step S31.

On the other hand, when the determining unit 131 determines that all guest networks have been processed (Yes in step S34), in step S35, the determining unit 131 further determines whether a predetermined time period has elapsed. This predetermined time period is the time interval of monitoring the elapsed time, which is, for example, one minute. When the determining unit 131 determines that the predetermined time period has not elapsed (No in step S35), the determining unit 131 executes the process of step S35 again.

When the determining unit 131 determines that the predetermined time period has elapsed (Yes in step S35), in step S36, the determining unit 131 sets all the guest networks as unprocessed and executes the process of step S31 again.

As described above, the information processing apparatus 10 according to the present embodiment monitors the elapsed time from the start of usage of the guest network, and executes a process of causing the wireless LAN access point 20 to delete the SSID of the guest network for which the possible usage time has been exceeded. This ensures that a guest network, which has been temporarily available for usage, becomes unavailable for usage. Therefore, even if the guest does not perform the operation of ending usage as illustrated in FIG. 11, for example, the information processing apparatus 10 monitors the elapsed time and causes the wireless LAN access point 20 to execute the process of deleting the SSID, and, therefore, the level of safety is high.

Further, by the guest performing the operation of ending usage as illustrated in FIG. 11, and by the network administrator performing the operation of ending usage of the guest network presently in use on the setting screen of the guest network as illustrated in FIG. 7, it is possible to flexibly delete an SSID of a guest network for which the possible usage time has not elapsed.

The password of the guest network in the SSID deletion process illustrated in FIG. 11 is an example of authentication information for authenticating the validity of the deletion instruction. By requiring input of authentication information in the operation of ending usage by a guest, it is possible to avoid unauthorized deletion of a guest network by a third party.

The guest network password authentication method makes it easier to install the system because there is no need to provide other authentication information separately.

The authentication information is not limited to a password of the guest network. The authentication information may be, for example, another password, fingerprint data, vocal print data, face image data, and the like. The method for authenticating the validity of the deletion instruction may be fingerprint authentication using fingerprint data, vocal print authentication using vocal print data, face authentication using face recognition data, etc.

In addition to the elapsed time monitoring process illustrated in FIG. 12, when the guest network creation application is activated, a process of deleting a guest network for which the elapsed time exceeds the possible usage time, may be performed. Specifically, the determining unit 131 of the information processing apparatus 10 may execute a series of processes from step S31 to step S34 of the elapsed time monitoring process after activating the guest network creation application. In this manner, even when the information processing apparatus 10 shuts down or when the elapsed time monitoring process is stopped due to abnormal termination and the like, an unnecessary guest network can be deleted by the activation of the guest network creation application.

The network administrator can input a character string of the SSID used for the guest network. This allows the SSID to be set flexibly according to the operation method.

The password generating unit 132 generates a random character string as a password for connecting to the network, thereby constructing a highly safe guest network. In order to simplify the introduction of the system, it is possible for the network administrator to input a password when making settings for the guest network, instead of generating a password every time.

The network administrator can input the possible usage time of the guest network. This allows the possible usage time to be set flexibly according to the operation method.

The guest network setting screen illustrated in FIG. 7 illustrates an example in which three guest networks are set. However, the number of settings of guest networks is not limited to three, and the number of settings of guest networks may be added or reduced.

An example in which the operation unit 14 of the information processing apparatus 10 is operated by the guest 9 in the SSID addition process illustrated in FIG. 9 and the SSID deletion process illustrated in FIG. 11, is described. Instead of the guest 9, the network administrator may operate the operation unit 14 in one of or both of the SSID addition process and SSID deletion process. When the network administrator operates the information processing apparatus 10 in the SSID addition process, the information for connecting to the guest network may be communicated from the network administrator to the guest 9.

The information processing apparatus 10 according to the present embodiment may be, for example, an output device such as a projector (PJ), a digital signage, a Head Up Display (HUD) device, an industrial machine, a medical device, a network home appliance, an automobile (Connected Car), a personal computer, a mobile phone, a tablet terminal, a game machine, a Personal Digital Assistant (PDA), a digital camera, a wearable PC, or a desktop PC.

Second Embodiment

A second embodiment will be described below with reference to the drawings. The second embodiment differs from the first embodiment in that a wireless LAN access point management apparatus is provided. Accordingly, in the description of the second embodiment below, only the differences from the first embodiment are explained. Elements having functional configurations similar to those of the first embodiment are denoted by the same reference numerals as those used in the description of the first embodiment, and descriptions thereof are omitted.

Figure 13:
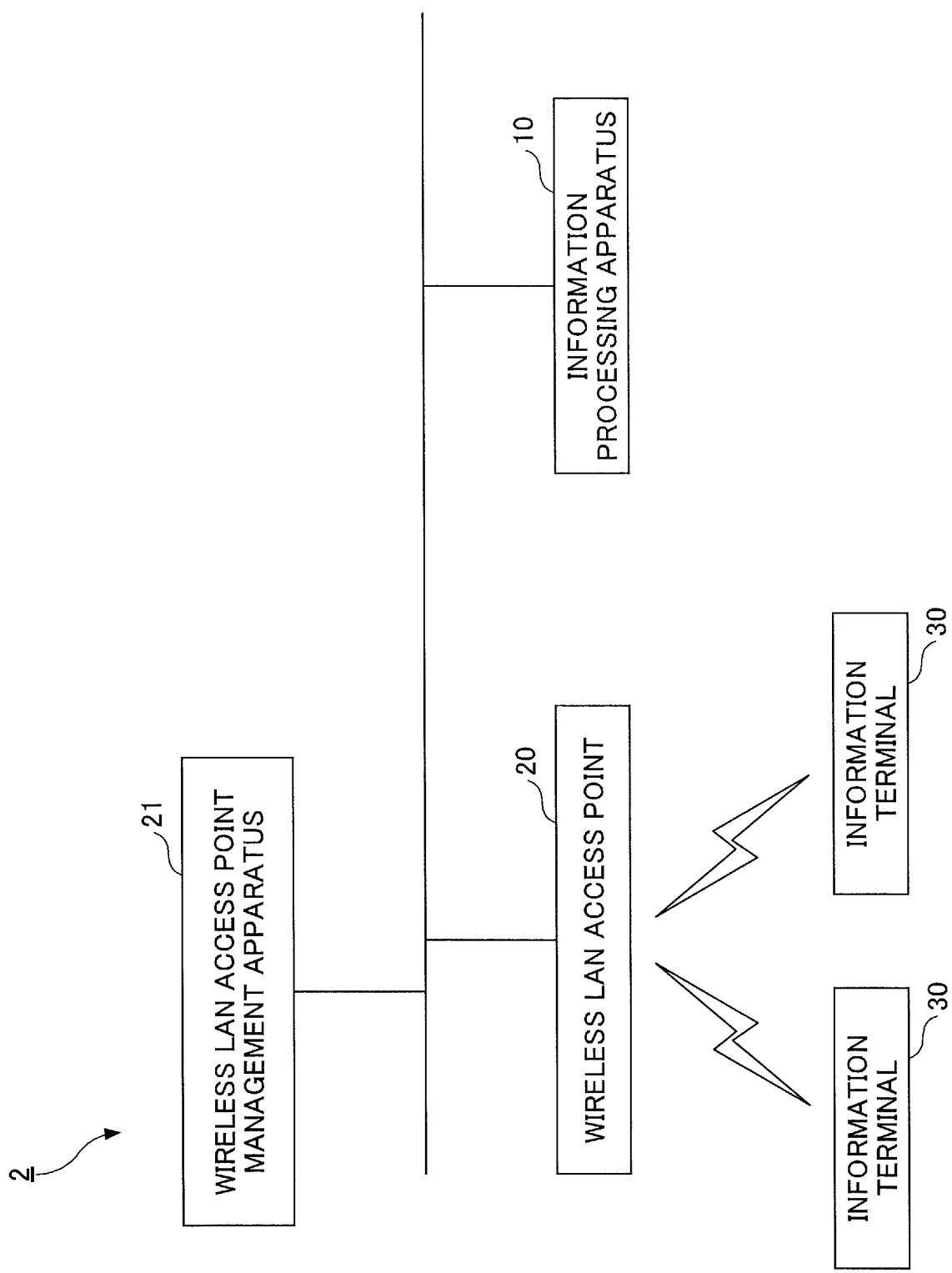
FIG. 13 is a diagram illustrating an example of a system configuration of a communication system according to a second embodiment of the present invention.
Figure 14:
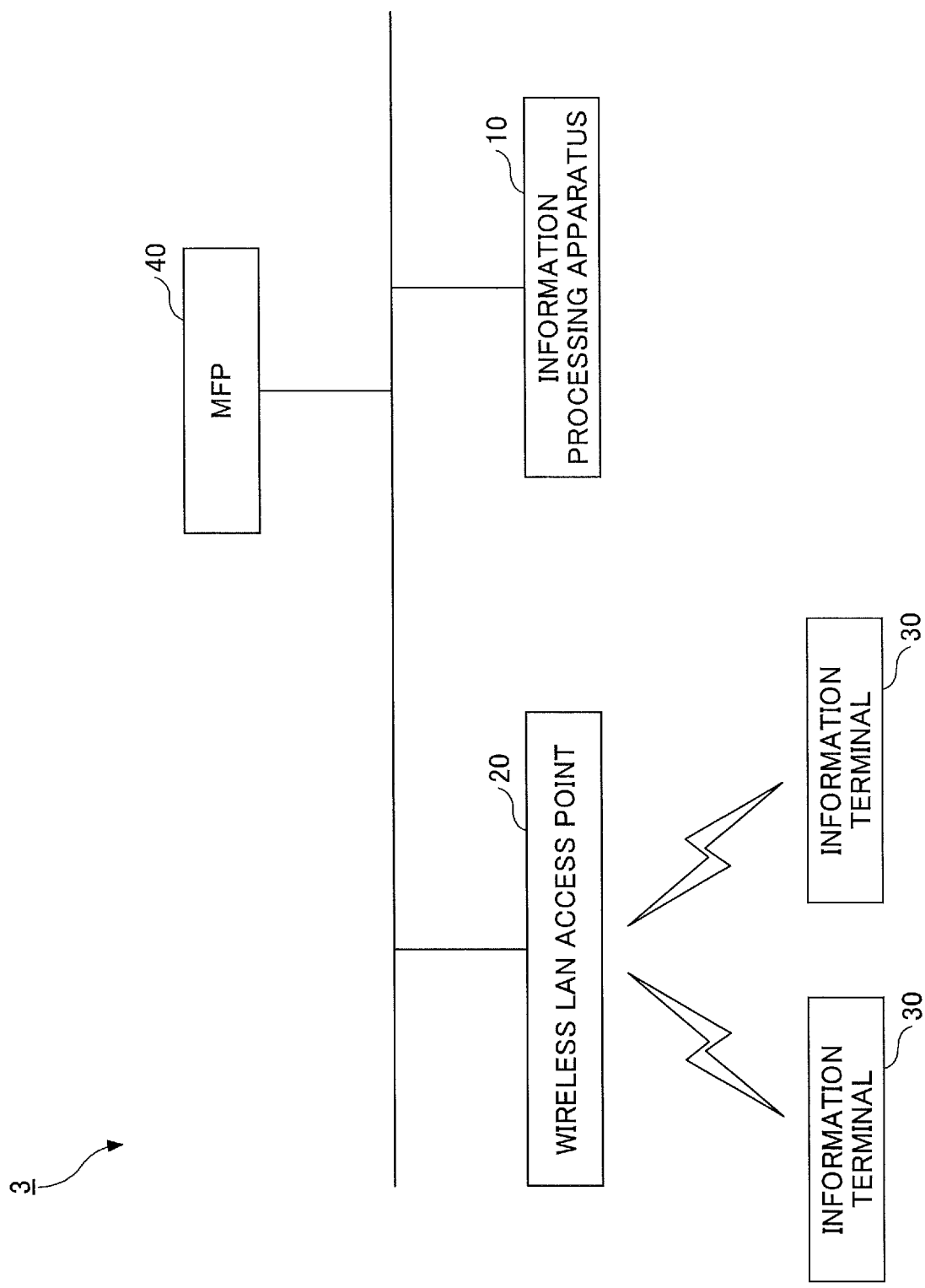
FIG. 14 is a diagram illustrating an example of a system configuration of a communication system according to a third embodiment of the present invention.

As illustrated in FIG. 13, a communication system 2 according to the second embodiment includes the information processing apparatus 10, the wireless LAN access point 20, a wireless LAN access point management apparatus 21, and the information terminal 30.

The communication unit 15 of the information processing apparatus 10 according to the present embodiment communicates with the wireless LAN access point management apparatus 21. That is, the addition request signal transmitting unit 151 transmits the addition request signal to the wireless LAN access point management apparatus 21, and the deletion request signal transmitting unit 152 transmits the deletion request signal to the wireless LAN access point management apparatus 21.

The wireless LAN access point management apparatus 21 is an apparatus for controlling the wireless LAN access point 20. The wireless LAN access point management apparatus 21 is communicatively connected to the information processing apparatus 10 and the wireless LAN access point 20. When the wireless LAN access point management apparatus 21 receives, from the information processing apparatus 10, an addition request signal or a deletion request signal for adding or deleting an SSID, the wireless LAN access point management apparatus 21 transmits, to the wireless LAN access point 20, the addition request signal or the deletion request signal for adding or deleting an SSID.

According to the communication system 2 according to the present embodiment, the wireless LAN access point management apparatus 21 is provided, and, therefore, a wireless LAN environment of a cloud management type can be implemented.

The communication system 2 may include a plurality of wireless LAN access points 20. In this case, one wireless LAN access point management apparatus 21 may control the plurality of wireless LAN access points 20. The wireless LAN access point management apparatus 21 may not be a single piece of hardware, but may be implemented by a cloud solution over a network.

The wireless LAN access point 20 according to the present embodiment is an example of a communication relay apparatus main body.

Third Embodiment

A third embodiment will now be described with reference to the drawings. The third embodiment differs from the first embodiment in that a Multifunction Peripheral/Product/Printer (MFP) is provided. Accordingly, in the description of the third embodiment below, only the differences from the first embodiment are explained. Elements having functional configurations similar to those of the first embodiment are denoted by the same reference numerals as those used in the description of the first embodiment, and descriptions thereof are omitted.

A communication system 3 according to the third embodiment includes the information processing apparatus 10, the wireless LAN access point 20, the information terminal 30, and an MFP 40.

The information processing apparatus 10 according to the present embodiment displays a message indicating that the addition of the SSID has been successful in step S20 of the SSID addition process illustrated in FIG. 9, and transmits, to the MFP 40, information for connecting to the guest network that has become possible to use, such as information on the SSID, the password, the usage start time, the usage end time, and the possible usage time.

The MFP 40 is a multifunction peripheral having functions such as those of a copier, a printer, an image scanner, and a facsimile machine. The MFP 40 is communicatively connected to the information processing apparatus 10 and the wireless LAN access point 20. The MFP 40 receives information for connecting to the network from the information processing apparatus 10 and prints the information on a medium such as paper.

Figure 15:
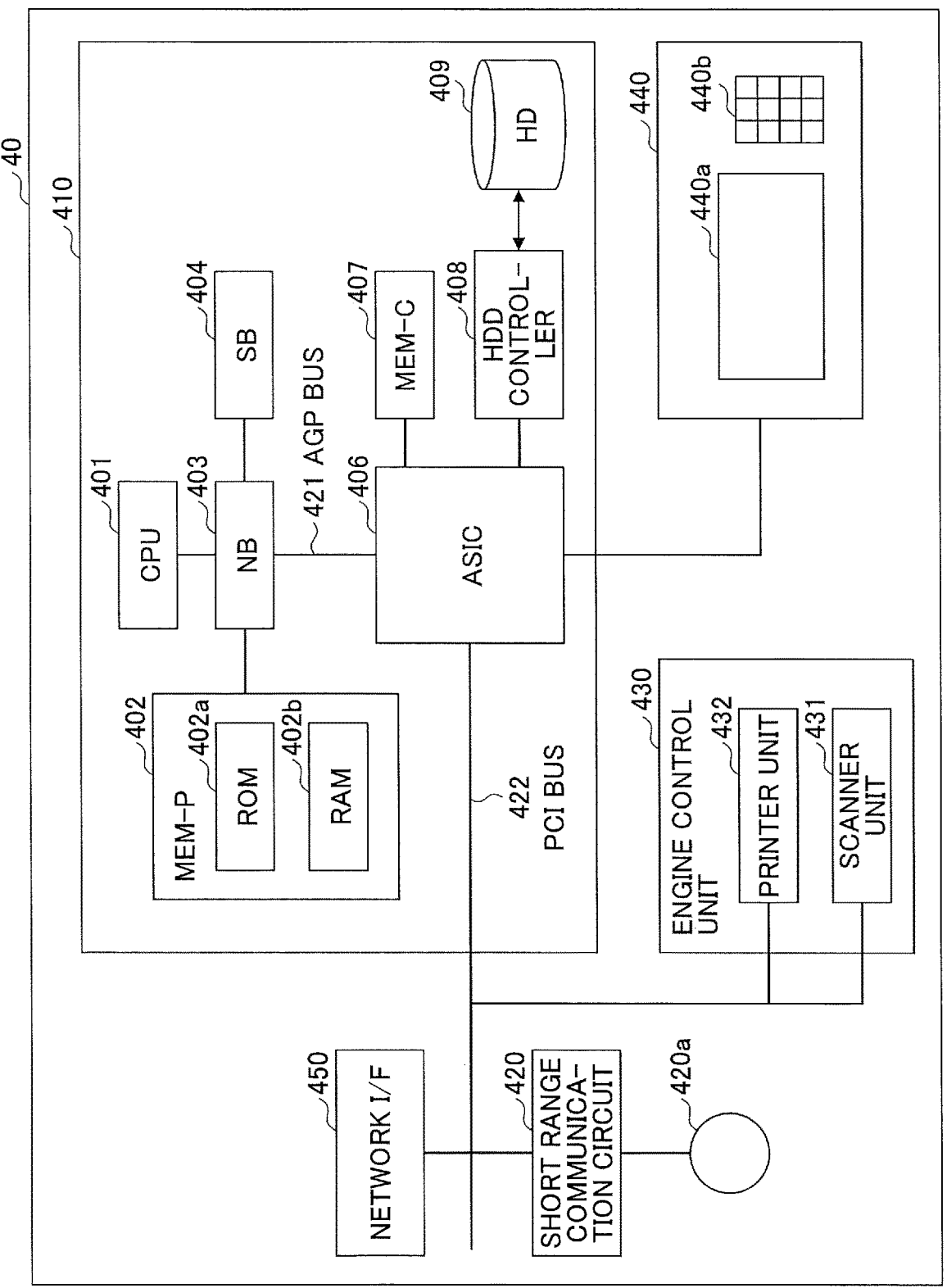
FIG. 15 is a diagram illustrating an example of a hardware configuration of an MFP according to the third embodiment of the present invention.

Next, the hardware configuration of the MFP 40 will be described. As illustrated in FIG. 15, the MFP 40 includes a controller 410, a short range communication circuit unit 420, an engine control unit 430, an operation panel 440, and a network I/F 450.

Among these, the controller 410 includes a CPU 401, a system memory (MEM-P) 402, a north bridge (NB) 403, a south bridge (SB) 404, an Application Specific Integrated Circuit (ASIC) 406, a local memory (MEM-C) 407, an HDD controller 408, and an HD 409 that is a storage unit, and the NB 403 is connected to the ASIC 406 by an Accelerated Graphics Port (AGP) bus 421.

Among these, the CPU 401 is a control unit that performs overall control of the MFP 40. The NB 403 is a bridge for connecting the CPU 401 to the MEM-P 402, the SB 404, and the AGP bus 421 and has a memory controller for controlling reading and writing to the MEM-P 402, a Peripheral Component Interconnect (PCI) master, and an AGP target.

The MEM-P 402 includes a ROM 402a, which is a memory for storing programs and data by which each function of the controller 410 is implemented, and a RAM 402b, which is used as a program or data expansion and a rendering memory for memory printing. The program stored in the RAM 402b may be configured to be recorded in a computer-readable recording medium such as a compact disk read-only memory (CD-ROM), a CD recordable (CD-R), or a digital versatile disc (DVD) in a file in an installable format or an executable format.

The SB 404 is a bridge for connecting the NB 403 to PCI devices and peripheral devices. The ASIC 406 is an integrated circuit (IC) for image processing purposes having hardware elements for image processing, and serves as a bridge connecting the AGP bus 421, a PCI bus 422, the HDD controller 408, and the MEM-C 407, respectively. The ASIC 406 includes a PCI target and AGP master, an arbitrator (ARB) that forms the core of the ASIC 406, a memory controller that controls the MEM-C 407, a plurality of Direct Memory Access Controllers (DMACs) that rotates image data by hardware logic, and the like, and a PCI unit that performs data transfer between the scanner unit 431 and the printer unit 432 via the PCI bus 422. The interface of the Universal Serial Bus (USB) or an Institute of Electronic and Electronic Engineers 1394 (IEEE 1394) may be connected to the ASIC 406.

The MEM-C 407 is a local memory used as an image buffer and a code buffer for copying. The HD 409 is a storage device for storing image data, storing font data used for printing, and storing forms. The HD 409 controls the reading or writing of data to the HD 409 according to the control of the CPU 401. The AGP bus 421 is a proposed bus interface for graphics accelerator cards to speed up graphics processing, and by directly accessing the MEM-P 402 with high throughput, the graphics accelerator card can be made faster.

The short range communication circuit unit 420 is provided with a short range communication circuit 420a. The short range communication circuit 420a is a communication circuit such as Near Field Communication (NFC), Bluetooth (registered trademark), and the like.

The engine control unit 430 further includes a scanner unit 431 and a printer unit 432. The operation panel 440 includes a panel display unit 440a, such as a touch panel, which displays a current setting value or a selection screen and accepts input from an operator, and an operation panel 440b, such as a numerical pad which receives a set value of an image forming condition, such as a density setting condition, and or a start key to receive a copy start instruction. The controller 410 controls the entire MFP 40 and controls, for example, rendering, communication, input from the operation panel 440, and the like. The scanner unit 431 or the printer unit 432 includes an image processing portion such as error diffusion or gamma conversion.

In the MFP 40, the application switching key of the operation panel 440 allows sequential switching of the document box function, the copy function, the printer function, and the facsimile function, so that one of these functions can be selected. When the document box function is selected, the document box mode is set, when the copy function is selected, the copy mode is set, when the printer function is selected, the printer mode is set, and when the facsimile function is selected, the facsimile mode is set.

The network I/F 450 is an interface for performing data communication with the information processing apparatus 10 using a network. The short range communication circuit unit 420 and the network I/F 450 are electrically connected to the ASIC 406 via the PCI bus 422.

According to the communication system 3 according to the present embodiment, by passing a medium, on which the MFP 40 has printed the information, to the guest, the information for connecting to the guest network can be easily conveyed to the guest, which is highly convenient.

The MFP 40 and the information processing apparatus 10 may not be separate apparatuses but may be a single apparatus. For example, the MFP 40 may implement some or all of the functions of the information processing apparatus 10. Alternatively, the MFP 40 and the information processing apparatus 10 may cooperate with each other to implement the above-described functions.

The communication system 3 may include an ink jet printer in place of the MFP 40. The information processing apparatus 10 may include a printing function. The MFP 40 is an example of a printing apparatus.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to one embodiment of the present invention, a network to be temporarily used can be provided.

The information processing apparatus, the communication system, and the information processing method are not limited to the specific embodiments described in the detailed description, and variations and modifications may be made without departing from the spirit and scope of the present invention.

What is claimed is:

1. An information processing apparatus comprising:
   circuitry; and
   a memory storing computer-executable instructions that cause the circuitry to:
      receive an operation of requesting activation of a guest network creation application from an information terminal used by a guest user,
      acquire a list of selectable guest network identifiers, in response to the received operation to request activation of the guest network creation application, the selectable guest network identifiers identifying a corresponding guest network whose setting have been configured by an administrator,
      display a network selection screen configured to display the acquired list of selectable guest network identifiers,
      receive a physical operation on the selection screen to initiate use of the guest network corresponding to a selected guest network identifier selected from among the list of selectable guest network identifiers,
      generate a random character string as a password for connecting to the guest network set by a communication relay apparatus in response to the operation to initiate use of the guest network, wherein the use of the guest network is initiated by:
         transmitting, to the communication relay apparatus, an addition request signal representing a request to add the selected identifier identifying the corresponding guest network to the communication relay apparatus, the addition request signal including the selected identifier and the random randomly generated character string password for connecting to the guest network, and
      transmit, to the communication relay apparatus, a deletion request signal including the selected identifier and the random character string password, the deletion request signal representing a request to delete the selected identifier upon determining that an elapsed time from when the communication relay apparatus has added the selected identifier has exceeded a possible usage time of using the guest network.

2. The information processing apparatus according to claim 1, wherein the circuitry further
   continuously determines whether the elapsed, time has exceeded the possible usage time, and
   transmits the deletion request signal to the communication relay apparatus upon determining that the elapsed time has exceeded the possible usage time.

3. The information processing apparatus according to claim 2, wherein the circuitry
   transmits the deletion request signal to the communication relay apparatus in a case where the circuitry determines that
      the elapsed time exceeds the possible usage time, and
      a subsequent addition request signal to add a second selected guest network identifier has been transmitted to the communication relay apparatus.

4. The information processing apparatus according to claim 1, wherein the circuitry further
   receives an operation of a deletion instruction to delete the selected identifier, and
   transmits the deletion request signal to the communication relay apparatus upon determining that the operation of the deletion instruction is received.

5. The information processing apparatus according to claim 4, wherein the circuitry further
   stores, in a storage, authentication information for authenticating validity of the deletion instruction, and
   determines whether the authentication information is input, wherein
   the deletion request signal is transmitted to the communication relay apparatus upon in a case where it is determined that
      the operation of the deletion instruction is received, and
      the authentication information has been input.

6. The information processing apparatus according to claim 5, wherein the authentication information includes the password for connecting to the guest network corresponding to the selected guest network identifier.

7. The information processing apparatus according to claim 1, wherein the circuitry further sets a character string representing the selected identifier according to an operation by a user, and transmits, to the communication relay apparatus, the addition request signal representing the request to add the selected identifier represented by the character string, that has been set.

8. The information processing apparatus according to claim 1, wherein the circuitry generates a random character string as the password.

9. The information processing apparatus according to claim 1, wherein the circuitry further sets the possible usage time according to an operation by a user.

10. A communication system comprising:
an information processing apparatus; and
a communication relay apparatus, wherein
the information processing apparatus includes:
a first circuitry; and
a first memory storing computer-executable instructions that cause the first circuitry to:
receive an operation of requesting activation of a guest network creation application from an information terminal used by a guest user;
acquire a list of selectable guest network identifiers, in response to the received operation to request activation of the guest network creation application, the selectable guest network identifiers identifying a corresponding guest network whose setting have been configured by an administrator;
display a network selection screen configured to display the acquired list of selectable guest network identifiers;
receive a physical operation on the selection screen to initiate use of the guest network corresponding to a selected guest network identifier selected from among the list of selectable guest network identifiers;
generate a random character string as a password for connecting to the guest network set by a communication relay apparatus in response to the operation to initiate use of the guest network, wherein the use of the guest network is initiated by:
transmitting, to the communication relay apparatus, an addition request signal representing a request to add the selected identifier identifying the corresponding guest network to the communication relay apparatus in response to the operation to request activation of the guest network, the addition request signal including the selected identifier and the randomly generated character string password for connecting to the guest network; and
transmit, to the communication relay apparatus, a deletion request signal including the selected identifier, the deletion request signal representing a request to delete the selected identifier upon determining that an elapsed time from when the communication relay apparatus has added the selected identifier has exceeded a possible usage time set as a time of using the guest network, and wherein
the communication relay apparatus includes:
a second circuitry; and
a second memory storing computer-executable instructions that cause the second circuitry to:
add the selected identifier and the password included in the addition request signal upon receiving the addition request signal from the information processing apparatus; and
delete the selected identifier included in the deletion request signal upon receiving the deletion request signal from the information processing apparatus.

11. The communication system according to claim 10, further comprising:
a printing apparatus, wherein
the first circuitry of the information processing apparatus transmits, to the printing apparatus, the selected identifier and the password included in the addition request signal and the possible usage time that is set in advance, and
the printing apparatus prints, on a medium, information including the identifier, the password, and the possible usage time received from the information processing apparatus.

12. The communication system according to claim 10, wherein the communication relay apparatus includes:
a management apparatus configured to manage a communication relay apparatus main body; and
the communication relay apparatus main body configured to be controlled by the management apparatus.

13. An information processing method performed by an information processing apparatus, the information processing method comprising:
receiving an operation of requesting activation of a guest network creation application from an information terminal used by a guest user;
acquiring a list of selectable guest network identifiers, in response to the received operation to request activation of the guest network creation application, the selectable guest network identifiers identifying a corresponding guest network whose setting have been configured by an administrator:
displaying a network selection screen configured to display the acquired list of selectable guest network identifiers; and
receiving a physical operation on the selection screen to initiate use of the guest network corresponding to a selected guest network identifier selected from among the list of selectable guest network identifiers; and
generating a random character string as a password for connecting to the guest network set by a communication relay apparatus in response to the operation to initiate use of the guest network;
initiating the use of the guest network by:
transmitting, to a communication relay apparatus, an addition request signal representing a request to add the selected identifier identifying the corresponding guest network to the communication relay apparatus in response to the operation to request activation of the guest network, the addition request signal including the selected identifier and the randomly generated character string password for connecting to the guest network; and
transmitting, to the communication relay apparatus, a deletion request signal including the selected identifier, the deletion request signal representing a request to delete the selected identifier upon determining that an elapsed time from when the communication relay apparatus has added the selected identifier has exceeded a possible usage time of using the guest network.

* * * * *